United States Patent [19]

Karlsson

[11] 3,997,126
[45] Dec. 14, 1976

[54] SPRING OPERATED, REVERSIBLY ROTATABLE BODY

[76] Inventor: Hans Ingemar Reimertz Karlsson, Vintervagen 17, 175 40 Jarfalla, Sweden

[22] Filed: Oct. 24, 1974

[21] Appl. No.: 517,676

[30] Foreign Application Priority Data

Oct. 30, 1973 Sweden .................... 7314694

[52] U.S. Cl. .............................. 242/107; 185/3 T; 242/107.4 R
[51] Int. Cl.² ............................ B65H 75/48
[58] Field of Search ............ 242/107–107.7; 280/744; 297/386–388; 185/37, 39; 267/156

[56] References Cited
UNITED STATES PATENTS

| 59,689 | 11/1866 | Weed | 242/107.2 |
| 924,669 | 6/1909 | Johnson | 185/37 |
| 2,923,491 | 2/1960 | Fischer et al. | 242/107 |
| 3,294,446 | 12/1966 | Fontaine | 242/107.4 X |

Primary Examiner—Stanley N. Gilreath
Assistant Examiner—John M. Jillions
Attorney, Agent, or Firm—Fred Philpitt

[57] ABSTRACT

An improvement of a spring operated, reversibly rotatable body having a surface on which a flexible, elongated object, e.g. a wire or a band, can be wound, said body being connected with a spring which is stretched by the rotation of the body during the unwinding of said elongated object. The improvement includes a transmission between the elongated object and the spring, said transmission having a gearing ratio which is varied during the rotation of the body. The variable gearing ratio can be obtained by giving the surface of the rotatable body, along the axis of rotation, a varying distance to the axis of rotation. In a preferred embodiment, two rotatable bodies, are used, said bodies being connected by means of a traction wire which is wound on the surfaces of said bodies. One of the bodies is connected with the spring and the other with an output shaft.

The aim of the improvement is to provide a means by which the tractive force caused by said spring in the elongated object during the rotation of said body can be varied as desired. The improvement is particularly useful in retractable safety belts to obtain a very low tractive force in the belt strap when almost fully extracted.

11 Claims, 5 Drawing Figures

SPRING OPERATED, REVERSIBLY ROTATABLE BODY

The present invention is related to an improvement of a spring operated, reversibly rotatable body which is provided with a surface on which a flexible, elongated object can be wound and which is connected to a spring arranged to be stretched by the rotation of the body during the unwinding of the elongated object from the body. The aim of the improvement is to make possible a continuous or stepwise variation of the tractive force provided by the spring in the elongated object during the rotation of the body. Spring operated, reversibly rotatable bodies can be used for instance for winding and unwinding of elongated objects such as wires, bands, flexible tubings and so on which have to be extended when used and which have to be rewound after use. The spring is often, but not necessarily always, arranged to automatically provide the winding or rewinding of the elongated object on the rotatable body.

The invention can particularly be used in connection with safety belts for vehicles, particularly motor cars. Such safety belts are today normally arranged to be automatically retracted, at least partly, into a house or cover when they are not in use. This is obtained by winding a strap of the safety belt on a spindle which is caused to rotate by means of a coil spring which has been stretched to a sufficient extent by the rotation of the spindle during the extension of the strap.

A disadvantage of the safety belts of the type now in use, the so called retractable belts, is that the tractive force exerted by the spring on the strap of the belt increases as the strap is unwound from the spindle and the spring is stretched. This is due to the facts in the known devices the shaft of the spindle is directly connected to the coil spring and that the tension in such a spring increases successively, when the spindle rotates during the unwinding of the strap. A further contributing factor is that the diameter of the strap coil decreases successively during the unwinding of the strap, thereby causing the lever between the point where the strap is unwound and the axis to successively decrease. The tractive force provided by the spring in the strap is thus small at the beginning of the unwinding operation but is then growing larger and larger. When the safety belt is in use, the larger portion of the strap has been extended, and then the tractive force provided by the spring in the strap has reached such a large value that the safety belt causes a comparatively strong pressure over the chest of the person in the belt. This pressure is uncomfortable for the person in the belt and this is a main reason for the fact that the safety belts in the motor cars to a large extent are not used during driving. Therefore, it is highly desirable to eliminate the cause for the uneasy feeling connected with the use of the safety belts today so that the safety belts will be used more frequently.

In this context, it should be observed that the problem cannot be solved only by decreasing the tractive force provided by the spring in the strap, as a minimum tractive force of a certain level is necessary for winding of the last part of the strap of the belt which is to be wound on the spindle. For this reason, the springs of the retractable safety belts now in use are generally prestretched.

The main object of the invention is to provide a device which makes it possible to vary the tractive force exerted by the spring on the wound elongated object as the spring is stretched during the unwinding of the object, so that the tractive force caused by the spring has always a desirable and acceptable momentary value.

A few embodiments of the invention will be described more in detail below with reference to the accompanying drawings.

Figure 1:
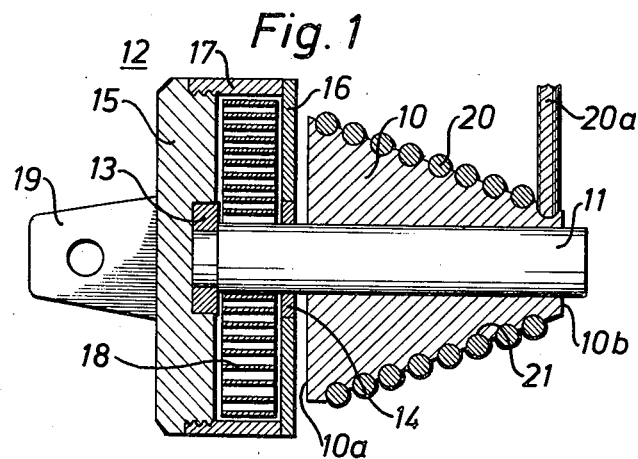
FIG. 1 shows a section of an embodiment of a device according to the invention.

In the embodiment shown in FIG. 1, a body 10 is positioned on a shaft 11 which is rotatably mounted in bearings so that the body 10 can be caused to rotate in both directions. One end of the shaft 11 extends into a cover 12 and is rotatably mounted in bearing 13, 14 in two opposite walls 15, 16 of the cover. The two walls 15, 16 are connected through a cylindrical casing 17 so that a closed cylindrical cover is formed. A coil spring 18 is positioned between the walls 15, 16 of the cover and the inner turn of the coil spring is fixed to the shaft 11 and the outer turn of the coil spring is fixed to the surrounding cylindrical wall or casing 17. The spring is so positioned that it is stretched during the rotation of the shaft in one direction, so that the energy stored in the spring then can be used for turning the shaft in the opposite direction back to the starting position. Furthermore, the cover 12 is provided with a mounting means 19 having a bore to facilitate fastening of the cover to a supporting surface.

The rotatable body 10 is so designed that a wire 20 can be wound on the body and then unwound from the body. One end of the wire is fixed to the body 10, and the wire is then wound around the body from one end surface 10a to another end surface 10b, i.e. in the Figure from the left end surface to the right end Surface, where the free end 20a of the wire leaves the body. The wire is so wound that the coil spring is stretched during the rotation of the body when pulling the free end of the wire outwards. When the tractive force outwards in the wire ceases, the tension of the spring will cause the wire to be rewound on the rotatable body.

The rotatable body 10 is designed substantially in the shape of a cone. Due to this shape the wire 20 will be unwound during the unwinding operation from a point which will be moved along a generatrix on the envelope surface of the cone in such a way that the point of unwinding will be positioned at a successively increasing distance from the axis of rotation of the body, thus making the lever acting during the rotation of the shaft by pulling the wire outwards longer and longer. Thus, by choosing a suitable slope of the generatrix in relation to the axis of the rotatable body the successively increasing tension of the spring can be compensated, so that the retractive force caused by the spring is maintained at a desirable or acceptable value during the complete unwinding operation.

In order to obtain an even distribution of the wire over the surface of the cone the cone is provided with a helical groove 21 of suitable width which runs from the top of the cone to the base of the cone and in which the wire can be positioned so that the different turns of the wire on the surface of the cone are prevented from sliding towards the top of the cone.

By changing the shape of the rotatable body the tractive force in the wire caused by the spring can be given a desired value in each point along the surface of the rotatable body during the unwinding of the wire. However, for practical reasons, the embodiment shown in FIG. 1 will give only rather limited variation possibilities. Therefore, the embodiment shown in FIG. 2 has been developed for the applications where larger variations of the tractive force in the wire have to be provided for a satisfying operation.

Figure 2:
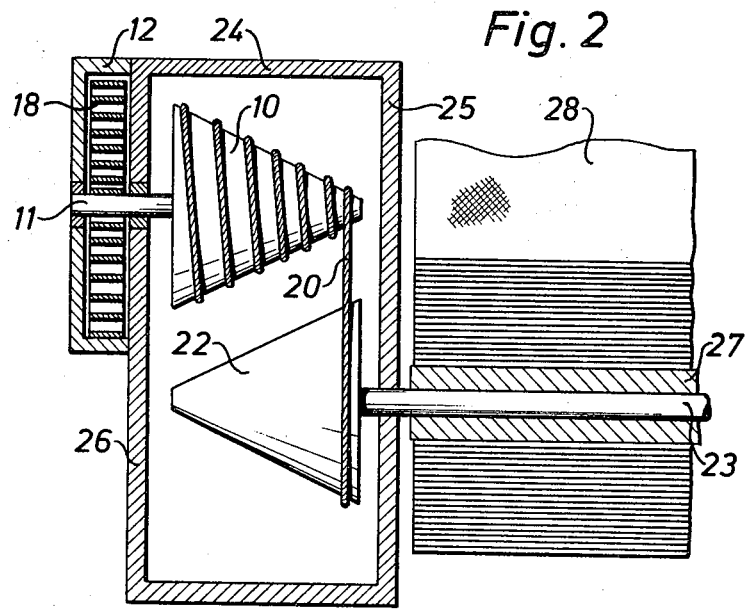
FIG. 2 shows, partly in section, a further development of the embodiment shown in FIG. 1 to obtain better possibilities to vary the tractive force caused by the spring.

In the embodiment shown in FIG. 2 the embodiment according to FIG. 1 has been provided with a further rotatable body 22 which is positioned on an output shaft 23. The two rotating bodies 10, 22 are positioned in a common cover 24, and the shafts 11, 23 of the two bodies extend through opposite walls 25, 26 of the cover. The shaft 11 of the body 10 is connected with the coil spring 18, and the shaft 23 of the body 22 is provided with a spindle 27, on which an elongated object in the shape of a band 28, e.g. a strap in a safety belt for motor cars, is wound. The two rotatable bodies 10, 22 are connected through the traction wire 20, one end of which is fixed to the body 10 and the other end of which is fixed to the body 22 and which is mainly wound on the body 10 when the spring is unstretched. When pulling the strap 28 from the spindle 27 the body 22 is caused to rotate, so that the wire 20 is wound on this body during a simultaneous stretching of the coil spring 18. When the strap is loosened, the body 22 is caused to rotate in opposite direction by the operation of the spring, so that the strap 28 is automatically rewound on the spindle 27.

By using two rotatable bodies 10, 22, which both have surfaces for winding the wire having a distance from the axis of rotation which varies along the axis of rotation, much better possibilities to vary the tractive force caused by the spring in the elongated object during the winding and unwinding of the object, respectively, is obtained. Particularly by using two cones as rotating bodies and by positioning said cones with parallel axes and the tops in different directions, as shown in FIG. 2, a substantial increase of the effect, which per se can be obtained with the embodiment according to FIG. 1, is obtained. With the embodiment shown in FIG. 2, in which the shaft 11 first is given a higher speed than the shaft 23 and then is given a lower speed than the shaft 23, there is no difficulty in obtaining a tractive force in the elongated object from the spring which successively decreases during the complete unwinding operation, which means that the tractive force has its smallest value when the elongated object has been extended or unwound to the maximum. This design is particularly convenient when the invention is applied to automatic safety belts for motor cars.

Figure 4:
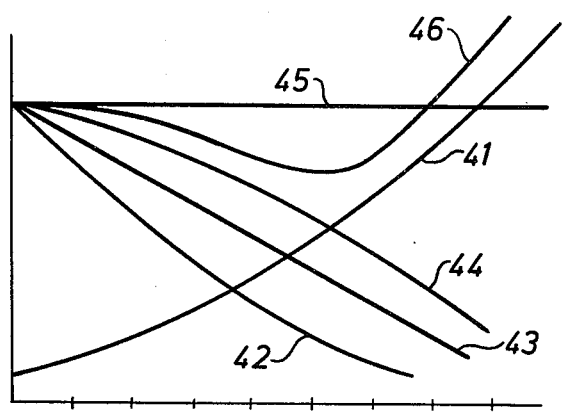
FIG. 4 shows a number of graphs indicating the dependence of the tractive force on the turning of the rotatable body.

FIG. 4 shows a few graphs 41–46 plotting the tractive force in e.g. a strap in a safety belt as a function of the number of revolutions which the rotatable body on which the strap is wound has turned around its axis of rotation. The graph 41 illustrates the situation in the previously known safety belts, in which the rotatable body consists of a cylindrical spindle and the coil spring is directly attached to the spindle. The tractive force in the strap caused by the spring thus increases successively as the strap is unwound from the spindle and the spindle turns around its axis. The graphs 42–44 illustrate three different possibilities of obtaining a successively decreasing tractive force in the strap. These graphs can be obtained by using conical or substantially conical rotating bodies 10, 22, as shown in FIG. 2. When the invention is applied to safety belts in motor cars, it is not necessary to obtain a linear decrease as also a non-linear decrease may be satisfying as well. Furthermore, the course of the graphs also depends on the properties of the spring and on the degree of the variation of the diameter of the strap coil during the unwinding and rewinding operations. Graph 45 illustrates a constant tractive force from the spring. Graph 46 illustrates eventually the possibility of obtaining a graph which shows a minimum (or a maximum) by using curved surfaces on the rotating bodies 10, 22, which may be of value in certain applications.

Figure 3:
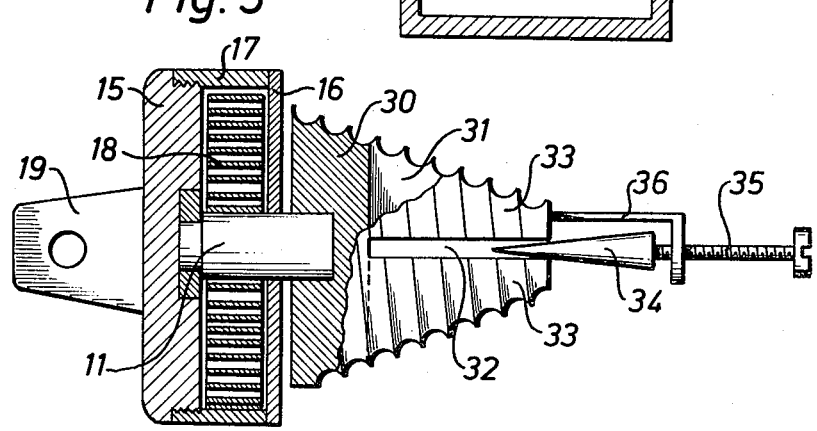
FIG. 3 shows an improvement of the embodiment shown in FIG. 1 to make it possible to adjust the surface of the rotatable body with the aim of obtaining the desired variation of the tractive force.

It is evident from what has been said above that the shape of the surfaces of the rotating bodies is decisive for the tractive force from the spring in the elongated object. However, it is very difficult to find out in advance which shape these surfaces shall have for obtaining the best result, as some of the influencing factors can only be calculated approximately in advance. It is therefore highly desirable to design the device in such a way that a certain adjustment can be made in connection with practical tests. A design which makes such adjustment possible is shown in FIG. 3. The conically designed, rotatable body 30 is at its top provided with two crossing slots 31, 32, so that the conical body at the top will consist of four portions 33, which are resilient in relation to each other and two of which are shown in the Figure. These portions can be moved from each other, so that the circumference of the rotatable body at the top increases, by forcing a conical body 34 into the centre of the slots by means of a screw 35. The screw 35 is rotatably mounted in an angle bar 36 which is attached to a portion 33 of the rotating body. The angle bar is preferably to some extent resilient, so that the tension between the screw and the angle bar when the top is expanded can be decreased by the resilient property of the angle bar. By moving the conical body 34 in relation to the rotatable body 30 the shape of the rotatable body can be changed within certain limits, thus giving a possibility of adjusting or readjusting the tractive force of the spring.

Figure 5:
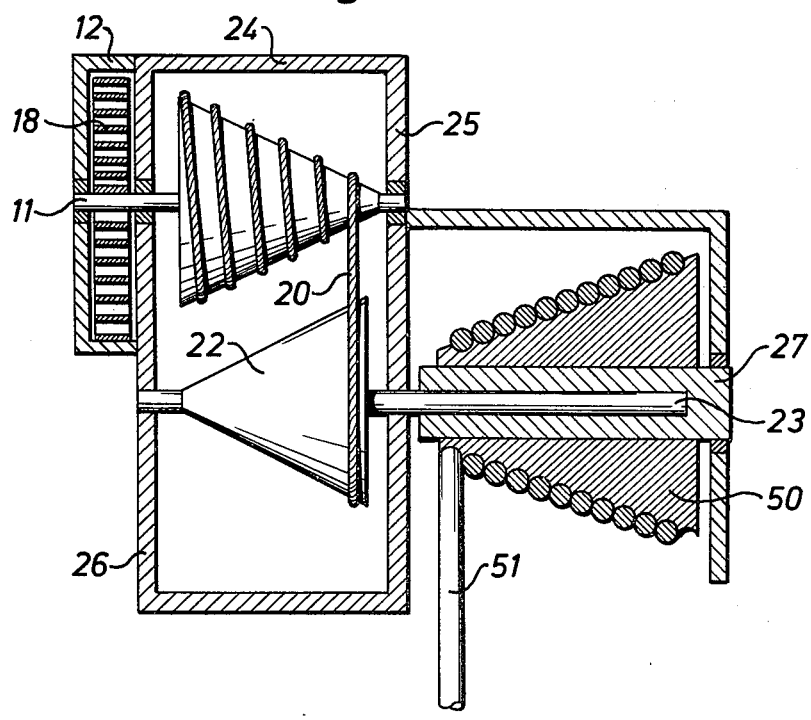
FIG. 5 shows a combination of the embodiments shown in FIGS. 1 and 2.

In FIG. 5 a further development of the embodiment according to FIG. 2 is shown. The shown embodiment is a combination of the embodiments according to FIGS. 1 and 2, as the cylindrical spindle 27 in FIG. 2 has been replaced by a conical body 50, the shape of which agrees with that of the body 10 in the embodiment according to FIG. 1. This combination will give a still better possibility of varying the desired tractive force in the elongated object, which in the embodiment according to FIG. 5 is a wire or rope 51. Also this embodiment can be used in connection with safety belts, provided that the strap in the safety belt is connected to the wire or the rope 51.

The operation of the device and the advantages of the device as compared with the previously used devices in connection with retractable safety belts for motor cars can easily be understood by the following comparison. In the previously known devices the coil spring has been attached directly to the shaft of the spindle on which the strap in the safety belt is wound. When the strap has been extended so much that the spindle has turned a full revolution, it is evident that the spring has been stretched one revolution for which work a certain tractive force has been required in the strap during the extending operation. If a device according to the present invention has been inserted, e.g. according to FIG. 2, there is a varying speed gear between the spindle and the spring shaft, which means that when the strap in the beginning of the extending operation has been extended so much that the spindle has turned a full revolution, the spring has been stretched several revolutions, which means that more work has been done and that a larger tractive force has been required in the strap. When the spindle during the end of the extending operation turns one revolution, the spring is stretched less than one revolution due to the changed speed gear, which means that less work has been done and that the required tractive force has therefore been less. In this comparison the change of diameter in the strap coil and the change in spring tension during the extending operation has not been dealt with, as these factors change in the same way in both cases. From the comparison made above it is also evident that the force which the strap exerts on a person in the safety belt is substantially less when a device according to the invention is used and the speed gear between the spindle and the spring shaft is changed in the indicated way during the extending operation.

Thus, the invention will make it possible to obtain a varying tractive force from the spring in the wound elongated object during the courses of unwinding and winding, respectively, in close agreement with the requirements for different fields of application. The invention has also the advantage that a substantially shorter spring can be used in the spring cover and that the requirements on the properties of the spring can be reduced. A shorter spring in combination with reduced requirements on the properties of the spring means lower manufacturing costs for the spring. The above mentioned pretension can also be reduced.

While only a few embodiments of the invention have been described and shown, it is evident that a great number of different embodiments and modifications are possible within the frame of the invention. The surfaces of the rotatable bodies can for instance have curved generatrices and one end can have a smaller circumference than the other or the ends can have equal circumferences, so that a concave or convex cylinder shaped body is formed. If two rotatable bodies are used, it is sometimes sufficient that only one body is so designed that the surface presents a distance to the axis which varies along the axis of rotation. The other body may then be a cylinder, the diameter of which has been chosen to obtain a convenient general speed gear between to two rotating bodies. The shown traction wire between the two rotatable bodies can be replaced by a gear wheel device or another drive wheel device. Instead of giving the body on which the elongated object is to be wound a surface with varying diameter, it is possible to use a cylindrical surface and by means of a transmission having per se well known elements provide a varying speed gear between the surface on which the elongated object is to be wound and the means stretching the spring. The surfaces may consist of friction material or elastic material, e.g. rubber, plastics, foam rubber. In such a case the groove can be omitted which results in a more efficient use of the surface, so that smaller rotating bodies can be used.

Furthermore, it is possible to use other types of springs than the one shown on the drawings and to use chains or other flexible traction means instead of the shown traction wire.

The device according to the invention has been described in connection with safety belts, but many other application fields are possible, as already indicated in the introductory portion of the specification. The embodiment according to FIG. 1 can for instance be used for winding flexible tubings which have to be extended and then automatically wound again after the use, when it is desirable to compensate for or eliminate the increase of the tractive force which is caused by the spring used for accomplishing the automatical rewinding. Another application field of the embodiment according to FIG. 1 is in connection with ceiling mounted working machines which when used have to be pulled down to a working place for accomplishing certain working operations, when a large retraction force from the mounting means is a considerable drawback when accomplishing the working operation.

Finally, the embodiments shown in FIG. 2 and 5, preferably with the shown coil spring omitted, can be used in travelling cranes as speed gearing means between a traction wire and a load carrying wire which preferably can be wound on a drum which has been inserted instead of the coil spring. The required tractive force in the traction wire will then be less and less as the lifting continues. The device will then work as a torque converter.

I claim:
1. A spring tensioning and rewinding device which comprises in combination:
    a. a rotatable output shaft that is mounted so that it is reversibly rotatable, and a reversibly rotatable input shaft mounted parallel to said rotatable output shaft,
    b. an elongated flexible member disposed concentrically around said rotatable output shaft so that when said rotatable output shaft is rotated in one direction said flexible member is in a wound condition and when said rotatable output shaft is rotated in the opposite direction said flexible member is in an unwound condition,
    c. a spring member mounted on said reversibly rotatable input shaft, said spring member being arranged to be stretched by the rotation of said output shaft during the unwinding of said elongated flexible member from said output shaft,
    d. means interconnecting said rotatable input shaft with one end of said rotatable output shaft, said means including
        1. a first tapered body having a base portion and a top mounted on said rotatable output shaft, said first tapered body being drivingly connected to said rotatable output shaft in both directions of rotation,
        2. a second tapered body having a base portion and a top mounted on said rotatable input shaft, the taper of said second tapered body being disposed opposite to the taper of said first tapered body and
        3. a traction wire having one end attached to said base portion of said first tapered body, the other end attached to said base portion of said second tappered body, and the intermediate portion wound around the exterior surfaces of said first and second tapered bodies so that the rotation of the rotatable output shaft in one direction results in winding of the traction wire around said first tapered body and a tensioning of said spring member and so that at some subsequent time said rotatable output shaft can be caused to rotate in the opposite direction by releasing the tension of said spring member, whereby the slope of the genatrix of said tapered bodies is such that the tractive force required to unwind said flexible member from said rotatable output shaft will decrease over the course of said unwinding.

2. A device according to claim 1 wherein said tapered bodies each have a conical configuration.

3. A device according to claim 1 wherein the surface of said output shaft upon which said elongated flexible member is connected has a tapered configuration, and the flexible member is connected thereto by a wire, said wire forming one layer on said surface and being unwound from the top of said configuration towards the base of said configuration.

4. A device according to claim 1 wherein at least one of said tapered bodies is split into at least two portions and a pointed member is adjustably mounted with respect to the opening of said split so that the pointed end can be inserted into said split opening and modify the taper of said tapered body.

5. A device according to claim 4 in which an angle bar is attached to said tapered body and said pointed member is a cone, said cone being movably mounted in one end of said angle bar by means of a threaded member passing through one end of said angle member.

6. A device according to claim 1 wherein said elongated flexible member is the strap of a safety belt.

7. A spring tensioning and rewinding device which comprises in combination:
   a. a rotatable output shaft that is mounted so that it is reversibly rotatable, and a reversibly rotatable input shaft mounted parallel to said rotatable output shaft,
   b. an elongated flexible member disposed concentrically around said rotatable output shaft so that when said rotatable output shaft is rotated in one direction said flexible member is in a wound condition and when said output shaft is rotated in the opposite direction said flexible member is in an unwound condition,
   c. a spring member mounted on said input shaft, said spring member being arranged to be stretched by the rotation of said output shaft during the unwinding of said elongated flexible member from said output shaft,
   d. means interconnecting said rotatable input shaft with one end of said rotatable output shaft, said means including
      1. a first conically-shaped body having a base portion and a top mounted on said rotatable output shaft, said first tapered body being drivingly connected to said rotatable output shaft in both directions of rotation,
      2. a second conically-shaped body having a base portion and a top mounted on said rotatable input shaft, the taper of said second conically-shaped body being disposed opposite to the taper of said first conically-shaped body, and
      3. a traction wire having one end attached to said base portion of said first conically-shaped body, the other end attached to said base portion of said second conically-shaped body, and the intermediate portion wound around the exterior surfaces of said first and second conically-shaped bodies so that the rotation of the rotatable output shaft in one direction results in winding of the traction wire around said first conically-shaped body and a tensioning of said spring member and so that at some subsequent time said rotatable output shaft can be caused to rotate in the opposite direction by releasing the tension of said spring member, whereby the slope of the genatrix of said tapered bodies is such that the tractive force required to unwind said flexible member from said output shaft will be decreased over the course of said unwinding, and
      4. a cover enclosing said two-conically shaped bodies, said rotatable output shaft extending from said cover in one direction and said rotatable input shaft extending from said cover in the opposite direction.

8. An arrangement for reducing the amount of tractive force necessary to extend the strap of an automatically retracting safety belt over the course of the extension of the belt, which arrangement comprises in combination:
   a. a rotatable output shaft that is mounted so that it is reversibly rotatable, and a reversibly rotatable input shaft mounted parallel to said rotatable output shaft,
   b. a belt strap attached to said rotatable output shaft so that when the rotatable output shaft is rotated in one direction said belt strap is in a wound condition and when said rotatable output shaft is rotated in the opposite direction said belt strap is in an unwound condition,
   c. a coil spring member having one end attached to said reversibly rotatable input shaft being arranged to be stretched by the rotation of said rotatable input shaft during the unwinding of said belt strap from said rotatable output shaft, and
   d. means interconnecting said rotatable input shaft with one end of said rotatable output shaft, said means including
      1. a first tapered body having a base portion and a top mounted on said rotatable output shaft, said first tapered body being drivingly connected to said rotatable output shaft in both directions of rotation,
      2. a second tapered body having a base portion and a top mounted on said rotatable input shaft, the taper of said second tapered body being disposed opposite to the taper of said first tapered body, and
      3. a traction wire having one end attached to said base portion of said first tapered body, the other end attached to said base portion of said second tapered body, and the intermediate portion wound around the exterior surfaces of said first and second tapered bodies so that the rotation of the rotatable output shaft in one direction results in winding of the traction wire around said first tapered body and a tensioning of said coil spring member and so that at some subsequent time said rotatable output shaft can be caused to rotate in the opposite direction by releasing the tension of said coil spring member, 4. the taper of said first and second bodies being such that the tractive force necessary for extension of the belt is substantially lower at the end of the extension operation than at the beginning.

9. A device according to claim 8 wherein said tapered bodies each have a conical configuration.

10. A device according to claim 8 wherein the surface of said rotatable output shaft to which said belt strap is connected has a tapered configuration and the belt strap is connected thereto by a wire, said wire forming one layer on said surface and being unwound from the top of said tapered configuration towards the base of said tapered configuration.

11. A device according to claim 8 which additionally includes a cover that encloses said two tapered bodies, said rotatable output shaft extending from said cover in one direction and said rotatable input shaft extending from said cover in the opposite direction.

* * * * *